US012618749B2

(12) United States Patent (10) Patent No.: US 12,618,749 B2
Hou et al. (45) Date of Patent: May 5, 2026

(54) POWDER SAMPLE ADDING DEVICE AND POWDER SAMPLE ADDING SYSTEM

(71) Applicant: SHENZHEN JINGTAI TECHNOLOGY CO., LTD., Shenzhen (CN)

(72) Inventors: Anxin Hou, Shenzhen (CN); Youlong Wei, Shenzhen (CN); Ruibin Mai, Shenzhen (CN); Jiandong Gao, Shenzhen (CN); Yang Liu, Shenzhen (CN)

(73) Assignee: SHENZHEN JINGTAI TECHNOLOGY CO., LTD., Shenzhen (CN)

( * ) Notice: Subject to any disclaimer, the term of this patent is extended or adjusted under 35 U.S.C. 154(b) by 293 days.

(21) Appl. No.: 18/427,849

(22) Filed: Jan. 31, 2024

(65) Prior Publication Data

US 2024/0167916 A1 May 23, 2024

Related U.S. Application Data

(63) Continuation of application No. PCT/CN2023/102877, filed on Jun. 27, 2023.

(30) Foreign Application Priority Data

Jun. 29, 2022 (CN) .......................... 202210763160.6
Dec. 14, 2022 (CN) .......................... 202211610484.2

(51) Int. Cl.
G01N 1/00 (2006.01)
(52) U.S. Cl.
CPC ......... G01N 1/00 (2013.01); G01N 2001/002 (2013.01)

(58) Field of Classification Search
CPC .......................... G01N 1/00; G01N 2001/002
(Continued)

(56) References Cited

U.S. PATENT DOCUMENTS

| | | | |
|---|---|---|---|
| 4,248,315 A | 2/1981 | Falinower | |
| 2009/0046535 A1* | 2/2009 | Carlson ................... | B01F 31/85 366/118 |
| 2020/0047925 A1 | 2/2020 | Hoepfer et al. | |

FOREIGN PATENT DOCUMENTS

| | | |
|---|---|---|
| CN | 107655734 A | 2/2018 |
| CN | 108569572 A | 9/2018 |

(Continued)

OTHER PUBLICATIONS

International Search Report,International Application No. PCT/CN2023/102877, mailed Oct. 12, 2023 (17 pages).
(Continued)

*Primary Examiner* — Peter J Macchiarolo
*Assistant Examiner* — Rodney T Frank

(57) ABSTRACT

The present application provides a powder sample adding device and a powder sample adding system. The powder sample adding device includes a first bracket and a sample adding mechanism. The first bracket includes a powder adding substrate and a powder bucket carrying member, the powder adding substrate is connected to the powder bucket carrying member. The sample adding mechanism is connected to the powder adding substrate. The sample adding mechanism includes a powder adding member, a stirring driving member, and a pressing-down driving member. The stirring driving member is connected to the powder adding member in a transmission way and configured to drive the powder adding member to rotate. The pressing-down driving member is rotatably connected to the powder adding (Continued)

member and configured to drive the powder adding member
to rise and fall relative to the powder adding substrate.

20 Claims, 7 Drawing Sheets

(58) Field of Classification Search
USPC ...................................................... 73/864.81
See application file for complete search history.

(56) References Cited

FOREIGN PATENT DOCUMENTS

| | | | |
|---|---|---|---|
| CN | 109382957 | A | 2/2019 |
| CN | 111795736 | A | 10/2020 |
| CN | 214066303 | U | 8/2021 |
| CN | 214121376 | U | 9/2021 |
| CN | 218307843 | U | 1/2023 |
| CN | 116027060 | A | 4/2023 |
| EP | 1195584 | A1 | 4/2002 |
| FR | 2970328 | A1 | 7/2012 |
| JP | H03113327 | A | 5/1991 |
| JP | 2871658 | B1 | 3/1999 |

OTHER PUBLICATIONS

Chinese First Office Action, Chinese Application No. 202211610484.
2, mailed Nov. 5, 2025 (22 pages).

* cited by examiner

631

633

624

64

65

64

60

— 67

— 66

400

POWDER SAMPLE ADDING DEVICE AND POWDER SAMPLE ADDING SYSTEM

CROSS-REFERENCE TO RELATED DISCLOSURES

The present application is a continuation of International Patent Application No. PCT/CN2023/102877, filed on Jun. 27, 2023, which claims priority to Chinese Patent Application No. 202210763160.6, entitled "A POWDER SAMPLE ADDING DEVICE AND POWDER SAMPLE ADDING SYSTEM", filed Jun. 29, 2022, and Chinese Patent Application No. 202211610484.2, entitled "A POWDER SAMPLE ADDING DEVICE AND POWDER SAMPLE ADDING SYSTEM", filed Dec. 14, 2022, which are herein incorporated by reference in their entirety.

TECHNICAL FIELD

The present disclosure relates to the field of powder sample adding technologies, and in particular to a powder sample adding device and a powder sample adding system.

BACKGROUND

In traditional technology, the development of a new material generally requires a longer time cycle, which consumes a lot of manpower and material resources. The repeated cycles of "preparation-performance evaluation-repreparation-performance re-evaluation" are explored until the material with the best performance is obtained.

However, the existing powders configured for material experiments are mainly added manually by experimenters. The powder addition efficiency and the accuracy of the powder addition amount are difficult to meet the experimental needs. Moreover, the labor cost is high, the error is large, the efficiency is low, and the powder cannot be quickly added with high throughput.

SUMMARY OF THE DISCLOSURE

One technical solution adopted by the present disclosure is to provide a powder sample adding device. The powder sample adding device includes a first bracket and a sample adding mechanism.

The first bracket includes a powder adding substrate and a powder bucket carrying member, the powder adding substrate is connected to the powder bucket carrying member, and the powder bucket carrying member is configured for carrying a powder adding bucket.

The sample adding mechanism is connected to the powder adding substrate, the sample adding mechanism includes a powder adding member, a stirring driving member, and a pressing-down driving member; the stirring driving member is connected to the powder adding member in a transmission way and configured to drive the powder adding member to rotate; the pressing-down driving member is rotatably connected to the powder adding member and configured to drive the powder adding member to rise and fall relative to the powder adding substrate; and the stirring driving member and the pressing-down driving member jointly act on the powder adding member, so that the powder adding member is in butt joint with the powder adding bucket, to drive the powder adding bucket to perform a powder adding operation.

In some embodiments, the powder adding member includes a sliding sleeve base, a rotating sliding sleeve, and a powder adding rod; the sliding sleeve base is connected to the powder adding substrate, and the rotating sliding sleeve is rotatably disposed inside the sliding sleeve base; the powder adding rod movably passes through the rotating sliding sleeve, and one end of the powder adding rod away from the powder adding bucket is rotatably connected to the pressing-down driving member, and the pressing-down driving member is configured to drive the powder adding rod to rise and fall relative to the rotating sliding sleeve; and the stirring driving member is connected to the rotating sliding sleeve in the transmission way, and configured for driving the rotating sliding sleeve to rotate, so as to drive the powder adding rod to rotate.

In some embodiments, the powder adding rod includes a first joint, a guide rod, a second joint, and an output rod; the first joint is rotatably connected to an output end of the pressing-down driving member; the guide rod movably passes through the rotating slide sleeve, and two opposite ends of the guide rod are respectively connected to the first joint and the second joint; and the output rod is connected to one side of the second joint away from the guide rod, and the output rod is configured to be in butt joint with the powder adding bucket.

The number of guide rods is at least two, and at least two guide rods are disposed in parallel.

In some embodiments, the stirring driving member includes a driving motor and a transmission assembly.

The transmission assembly is disposed between an output end of the driving motor and the rotating sliding sleeve, wherein the transmission assembly includes a first gear and a second gear, the first gear is connected to the output end of the driving motor, the second gear is connected to the rotating slide sleeve, and the first gear and the second gear are meshed with each other.

In some embodiments, the powder sample adding device further includes a pressing mechanism, and the pressing mechanism is disposed on the powder adding substrate and configured for pressing the powder bucket onto the powder bucket carrying member.

The pressing mechanism includes a pressing driving member and a pressing member, and the pressing driving member is disposed on one side of the powder adding substrate away from the powder adding bucket; a window is defined on the powder adding substrate, and the pressing member passes through the window to extend towards the powder adding bucket; and the pressing driving member is connected to the pressing member and configured for driving the pressing member to press the powder adding bucket or release the powder adding bucket.

In some embodiments, the powder sample adding device further includes a micro-vibration assembly connected to the powder bucket carrying member and configured to drive the powder bucket carrying member to vibrate.

In some embodiments, the micro-vibration assembly is further connected to the powder adding substrate.

The micro-vibration assembly includes a micro-vibration member and a vibration frame, the micro-vibration member is connected to the powder adding substrate, and the vibration frame is connected to the micro-vibration member and the powder bucket carrying member.

In some embodiments, the powder bucket carrying member includes a first powder bucket positioning part configured to fix the powder adding bucket.

One side of the first powder bucket positioning part away from the powder adding substrate defines an opening to avoid the powder adding bucket.

The powder sample adding device further includes a powder bucket support, the powder bucket support includes a second powder bucket positioning part that is cooperates with the first powder bucket positioning part; the powder bucket support is detachably positioned and assembled on the powder bucket carrying member, so that the powder adding bucket is simultaneously disposed on the first powder bucket positioning part and the second powder bucket positioning part.

In some embodiments, the powder bucket support includes a support part and a pick-up part, the second powder bucket positioning part is located on the support part, and the pick-up part is connected to the support part and extends outward from one side of the support part; the powder bucket support further includes a powder bucket grab rod disposed on the pick-up part, and the powder bucket grab rod is configured for being picked up to carry the powder adding bucket for loading and unloading on the powder bucket support.

In some embodiments, the powder sample adding device further includes a balance disposed on one side of the powder bucket carrying member away from the sample adding mechanism, and the balance is configured for carrying and weighing a container to be added with the powder.

In some embodiments, the powder sample adding device further includes a vertical moving mechanism, and a driving end of the vertical moving mechanism is connected to the first bracket, and configured to drive the sample adding mechanism and the powder adding bucket to rise and fall with the first bracket, so as to adjust a distance between the container on the balance and the powder adding bucket in a vertical direction.

In some embodiments, the powder sample adding device further includes a carrying platform and a horizontal driving mechanism, wherein the horizontal driving mechanism is configured to drive the carrying platform to move along a first horizontal direction and/or a second horizontal direction, and the first horizontal direction is perpendicular to the second horizontal direction; the balance is disposed on the carrying platform; and the horizontal driving mechanism and the vertical moving mechanism are disposed independently of each other, and the first bracket and the carrying platform are disposed independently of each other.

In some embodiments, the powder sample adding device further includes a horizontal moving mechanism, wherein the horizontal moving mechanism is connected to the vertical moving mechanism and configured for driving the vertical moving mechanism to move along a horizontal direction perpendicular to a direction of rising and falling, so as to adjust the distance between the container on the balance and the powder adding bucket in a horizontal direction.

In some embodiments, the powder sample adding device further includes a windproof assembly, wherein the windproof assembly defines a windproof cavity that at least partially surrounds the balance and container, and a powder outlet of the powder adding bucket is aligned with and communicated with the windproof cavity. That is, the powder outlet of the powder adding bucket is in butt joint with the windproof cavity.

In some embodiments, the windproof assembly includes a first windproof member and a second windproof member, wherein the first windproof member is disposed around the balance.

The powder sample adding device further includes a second bracket connected to the first bracket, the second windproof member is connected to the second bracket, and the vertical moving mechanism is connected to the second bracket and configured for driving the second bracket to rise and fall, so that the second windproof member covers the first windproof member to form the windproof cavity.

In some embodiments, the first windproof member includes a front wall, two side walls, and a first rear wall that are disposed around the balance; the second windproof member includes a top cover configured for covering a cavity formed by the front wall, the two side walls, and the first rear wall; and the top cover defines an opening configured for butt joint with the powder adding bucket.

In some embodiments, a limit member is disposed on the vertical moving mechanism, and the limit member is configured to limit a descending stroke of the vertical moving mechanism to prevent the top cover from hitting against the first rear wall.

The second windproof member further includes a second rear wall connected to the top cover, a height of the first rear wall is smaller than that of the front wall and smaller than that of each of the two side walls, and the second rear wall is configured to cover a gap between the top cover and the first rear wall; and a sum of the heights of the first rear wall and second rear wall is greater than or equal to the height of the front wall and greater than or equal to the height of each of the two side walls.

In some embodiments, the windproof assembly includes a first box body and a second box body, the second box body is hinged with the first box body and cover the balance, and an opening that is in butt joint with the powder adding bucket is defined on the first box body or the second box body.

The windproof assembly includes a first windproof member and a second windproof member, the first windproof member includes a first surrounding wall disposed around the balance, the second windproof member includes a top cover and a second surrounding wall connected to the top cover, and the top cover defines an opening configured for butt joint with the powder adding bucket; in response to the second windproof member covering the first windproof member, the first surrounding wall and the second surrounding wall are sleeved with each other.

The windproof assembly includes a windproof cover and a door body disposed on the windproof cover, and the windproof cover at least surrounds the balance and the sample adding mechanism.

The windproof assembly includes a windproof cover connected to the first bracket, the windproof cover defines an opening that is in butt joint with the powder adding bucket; and in response to the vertical moving mechanism driving the first bracket to fall, the windproof cover covers the balance and the container.

In some embodiments, the powder sample adding device further includes a horizontal adjustment member and an anti-vibration assembly.

The balance is disposed on the horizontal adjustment member, and the horizontal adjustment member is configured to keep the balance in a horizontal state.

The horizontal adjustment member is disposed on the anti-vibration assembly.

The anti-vibration assembly includes a first anti-vibration member and a second anti-vibration member, wherein the second anti-vibration member is movably connected to one side of the first anti-vibration member, and the second anti-vibration member supports the horizontal adjustment member.

The anti-vibration assembly further includes a plurality of anti-vibration feet fixedly connected to the other side of the first anti-vibration member.

Another technical solution adopted by the present disclosure is to provide a powder sample adding system. The powder sample adding system includes an experimental platform, any one of above-mentioned powder sample adding device, and a transport device.

The powder sample adding device is disposed on the experimental platform.

The transport device is disposed on the experimental platform, and the transport device is configured to take away and place the powder adding bucket on the powder bucket carrying member of the powder sample adding device; and/or take away and place the container on the balance of the powder sample adding device.

BRIEF DESCRIPTION OF THE DRAWINGS

In order to more clearly illustrate the technical solutions in some embodiments of the present disclosure or in the related art, hereinafter, a brief introduction will be given to the accompanying drawings that are used in the description of some embodiments or the related art. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

The technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

The terms "first" and "second" in the present disclosure are only configured to describe purposes and cannot be understood as indicating or implying relative importance or implicit indicating the quantity of technical features indicated. Therefore, features limited to "first" and "second" may explicitly or implicitly include at least one of these features. In the description of the present disclosure, "multiple" means at least two, such as two, three, etc., unless otherwise expressly and specifically qualified. In addition, the terms "including", "comprising", and "having", as well as any variations of the terms "including", "comprising", and "having", are intended to cover non-exclusive inclusions. For example, a process, method, system, product, or device that includes a series of operations or units is not limited to the listed operations or units, but optionally includes operations or units that are not listed, or optionally includes other operations or units that are inherent to these processes, methods, products, or devices.

The reference to "embodiments" in the present disclosure means that, specific features, structures, or characteristics described in conjunction with some embodiments may be included in at least one embodiment of the present disclosure. The phrase appearing in various positions in the specification does not necessarily refer to the same embodiment, nor is it an independent or alternative embodiment that is mutually exclusive with other embodiments. Those of ordinary skill in the art explicitly and implicitly understand that the embodiments described in the present disclosure can be combined with other embodiments.

Figure 1:
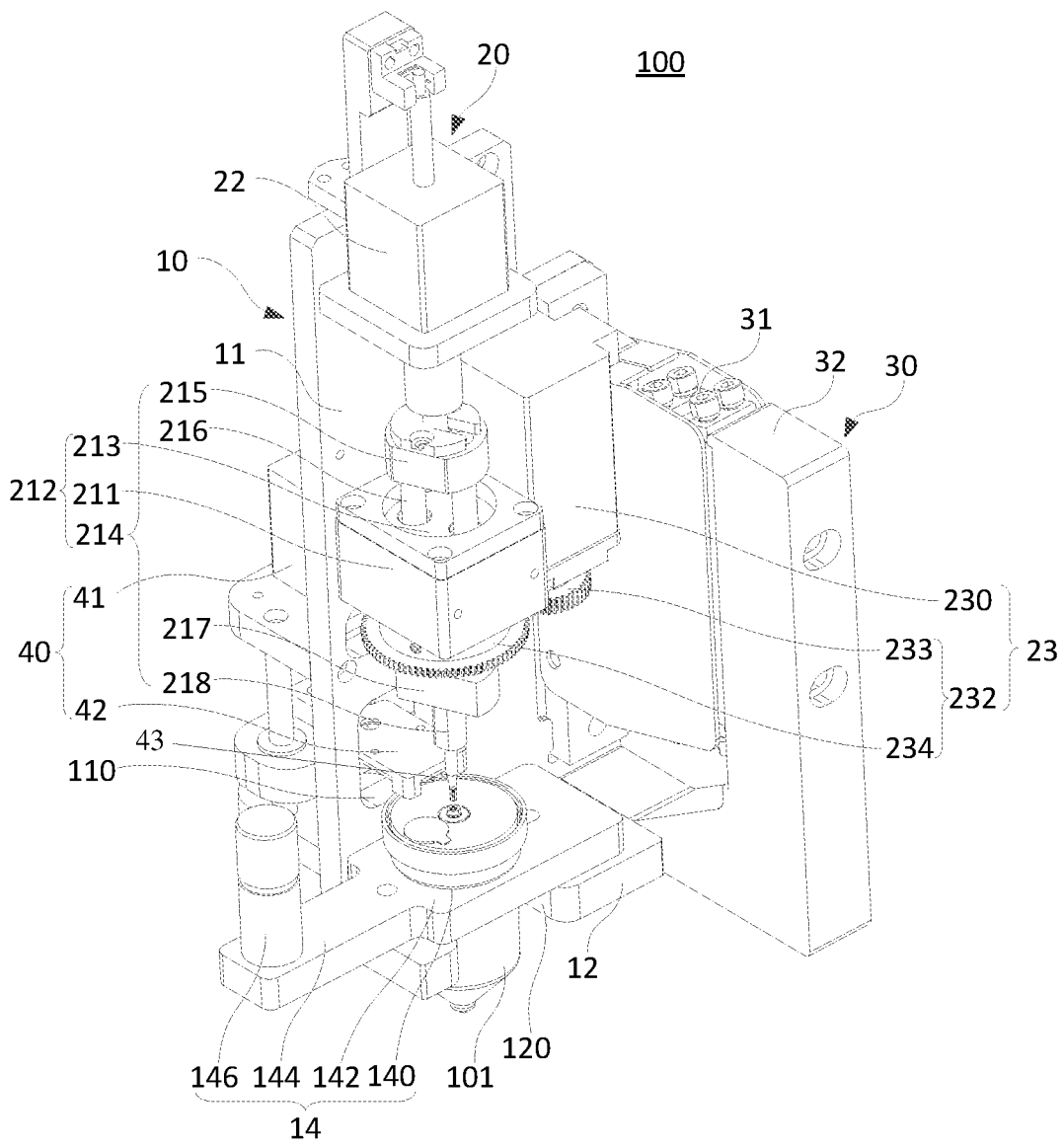
FIG. 1 is a structural schematic view of a powder sample adding device in some embodiments of the present disclosure.

The present disclosure provides a powder sample adding device 100, as illustrated in FIG. 1, FIG. 1 is a structural schematic view of a powder sample adding device in some embodiments of the present disclosure.

The powder sample adding device 100 includes a first bracket 10 and a sample adding mechanism 20. The first bracket 10 includes a powder adding substrate 11 and a powder bucket carrying member 12. The powder adding substrate 11 is connected to the powder bucket carrying member 12. The powder bucket carrying member 12 is configured to carry a powder adding bucket 101. The sample adding mechanism 20 is connected to the powder adding substrate 11. The sample adding mechanism 20 is configured to dock the powder adding bucket 101 to drive the powder adding bucket 101 to perform an adding powder operation, so as to replace manual adding powder and achieve automation of the adding powder action.

In some embodiments, the powder adding substrate 11 may be a rectangular plate or an L-shaped plate, etc., and the powder bucket carrying member 12 may be a flat plate structure. The powder adding substrate 11 may be connected to the powder bucket carrying member 12 by a fastener, such as a screw or a pin. The powder bucket carrying member 12 defines a positioning groove or a positioning hole configured for positioning the powder adding bucket 101, to prevent the powder adding bucket 101 from moving randomly during adding powder, thereby avoiding affecting powder sample adding efficiency. The powder bucket carrying member 12 may be provided with a powder outlet, so that the powder adding bucket 101 may add powder to a container to be added with the sample that is below the powder adding bucket 101 through the powder outlet.

In some embodiments, the powder sample adding device 100 may further include a micro-vibration assembly 30. The micro-vibration assembly 30 is connected to the powder bucket carrying member 12. The micro-vibration assembly 30 is configured to drive the powder bucket carrying member 12 to vibrate during adding powder, so as to cause the powder adding bucket 101 carried by the powder bucket carrying member 12 to vibrate, thereby improving the powder adding efficiency and reducing a risk of blocking the powder.

The micro-vibration assembly 30 may be a vibrator disposed on the powder bucket carrying member 12. The micro-vibration assembly 30 has a high-frequency micro-vibration function to improve the fluidity of the powder in the powder adding bucket 101, thereby improving the powder adding efficiency.

In some embodiments, the micro-vibration assembly 30 is also connected to the powder adding substrate 11. That is, the micro-vibration assembly 30 also drives the powder adding substrate 11 and the sample adding mechanism 20 to synchronously micro-vibrate with the powder adding bucket 101, which may effectively reduce the collision interference between the sample adding mechanism 20 and the powder adding bucket 101, thereby reducing the malfunction rate of the powder sample adding device 100.

In the present embodiment, the micro-vibration assembly 30 includes a micro-vibration member 31 and a vibration frame 32. The micro-vibration member 31 is connected to the powder adding substrate 11, and the vibration frame 32 is connected to the micro-vibration member 31 and the powder bucket carrying member 12. The micro-vibration member 31 may be the vibrator, and the vibration frame 32 is fixedly connected between the micro-vibration member 31 and the powder bucket carrying member 12, so that the micro-vibration member 31 and the powder adding bucket 101 synchronously vibrate through driving the first bracket 10 and the sample adding mechanism 20 by the micro-vibration member 31 during the micro-vibration member 31 being in operating. In this case, the powder bucket carrying member 12 is connected to the powder adding substrate 11 through the vibration frame 32 and the micro-vibrating member 31, and does not need to be directly connected to the powder adding substrate 11.

In the present embodiment, the sample adding mechanism 20 may include a powder adding member 212, a stirring driving member 23, and a pressing-down driving member 22. The stirring driving member 23 is connected to the powder adding member 212 in a transmission way and is configured to drive the powder adding member 212 to rotate. The pressing-down driving member 22 is rotatably connected to the powder adding member 212 and is configured to drive the powder adding member 212 to move up and down relative to the powder adding substrate 11. The stirring driving member 23 and the pressing-down driving assembly 22 jointly act on the powder adding member 212, so that the powder adding member 212 is in butt joint with the powder adding bucket 101, to drive the powder adding bucket 101 to perform the powder adding operation.

In some embodiments, one end of the powder adding member 212 away from the powder adding bucket 101 is rotatably connected to an output end of the pressing-down driving member 22, so that the powder adding member 212 may be simultaneously driven by the stirring driving member 23 and the pressing-down driving member 22 to rotate and rise and fall.

The powder adding member 212 includes a sliding sleeve base 211, a rotating sliding sleeve 213, and a powder adding rod 214. The sliding sleeve base 211 is connected to the powder adding substrate 11. The rotating sliding sleeve 213 is rotatably disposed inside the sliding sleeve base 211. The powder adding rod 214 movably passes through the rotating sliding sleeve 213. One end of the powder adding rod 214 away from the powder adding bucket 101 is rotatably connected to the output end of the pressing-down driving member 22. The pressing-down driving member 22 is configured to drive the powder adding rod 214 to rise and fall relative to the rotating sliding sleeve 213. The stirring driving member 23 is connected to the rotating sliding sleeve 213 in the transmission way, and is configured to drive the rotating sliding sleeve 213 to rotate to drive the powder adding rod 214 to rotate.

The stirring driving member 23 may include a driving motor 230 and a transmission assembly 232. The transmission assembly 232 is disposed between the driving motor 230 and the powder adding member 212, and may be configured for speed reduction transmission or transmission at the same speed.

The transmission assembly 232 may be a gear assembly. For example, the gear assembly includes a first gear 233 and a second gear 234 meshed with each other. The first gear 233 is connected to an output end of the driving motor 230, and the second gear 234 is connected to the rotating sliding sleeve 213.

In some embodiments, the transmission assembly 232 may also be a belt mechanism or a sprocket chain mechanism. For example, the transmission assembly 232 includes a first synchronous wheel, a second synchronous wheel, and a synchronous belt connected to the first synchronous wheel and the second synchronous wheel. The first synchronous wheel is connected to the output end of the driving motor 230, and the second synchronous wheel is connected to the rotating sliding sleeve 213. The stirring driving member 23 may only include the driving motor 230, or the stirring driving member 23 may include a driving cylinder and a rack mechanism, which is not specifically limited in the present disclosure.

The sliding sleeve base 211 is configured to carry and support the powder adding rod 214. The powder adding rod 214 may rise and fall relative to the powder adding bucket 101, so that the powder adding rod 214 may be in butt joint with or away from the powder adding bucket 101.

In some embodiments, a lifting mechanism is further disposed to drive the powder adding bucket 101 or the powder bucket carrying member 12 to rise and fall, so that the powder adding member 212 is in butt joint with the powder adding bucket 101. The lifting mechanism may be a cylinder, or include a motor and a screw mechanism, so that the powder adding bucket 101 or the powder bucket carrying member 12 is droved to rise and fall by the screw mechanism. Alternatively, the lifting mechanism drives the powder adding substrate 11 to rise and fall relative to the powder bucket carrying member 12.

One end of the powder adding rod 214 is movably connected to the output end of the pressing-down driving member 22, so that the powder adding rod 214 may rotate relative to the pressing-down driving member 22. Thus, the up and down movement and the stirring rotation of the powder adding rod 214 do not interfere with each other.

In the present embodiment, the powder adding rod 214 includes a first joint 215, a guide rod 216, a second joint 217, and an output rod 218. The first joint 215 is a floating rotary joint, which is rotationally connected to the output end of the pressing-down driving member 22. The guide rod 216 movably passes through the rotating sliding sleeve 213, and two opposite ends of the guide rod 216 are fixedly connected to the first joint 215 and the second joint 217, respectively.

The output rod 218 is connected to a side of the second joint 217 away from the guide rod 216. The output rod 218 is configured to be in butt joint with the powder adding bucket 101.

In some embodiments, the number of guide rods 216 may be at least two, and the at least two guide rods 216 are disposed in parallel.

The number of guide rods 216 may be two, three, or four, etc. The at least two guide rods 216 are disposed in parallel, so that the at least two guide rods 216 movably pass through the rotating sliding sleeve 213. By disposing the at least two guide rods 216, it may play a role in transmitting stirring rotation, so that the rotating sliding sleeve 213 may drive the at least two guide rods 216 to rotate, and the at least two guide rods 216 may also cooperate with the rotating sliding sleeve 213 to play a guiding role, which may improve butt joint accuracy of the powder adding bucket 101.

In some embodiments, the guide rod 216 may also be one, which has a special-shaped structure. The guide rod 216 may drive the rotating sliding sleeve 213 to rotate relative to the sliding sleeve base 211, and the guide rod 216 itself may rise and fall relative to the rotating sliding sleeve 213.

In the present embodiment, there are two guide rods 216. The first joint 215 and the second joint 217 are configured to fix the two guide rods 216. The output rod 218 may be adapted to the powder adding bucket 101 to facilitate butt joint with the powder adding bucket 101. For example, a butt joint port of the powder adding bucket 101 is relatively small, and the output rod 218 may be relatively thin.

A material of the rotating sliding sleeve 213 may be a poly ether ether ketone (PEEK) engineering plastic or a polyphenylene sulfide (PPS) engineering plastic. The material has high strength, strong chemical stability, wear resistance and good lubricity.

The pressing-down driving member 22 may be a pressing-down cylinder, a pressing-down electric cylinder or a screw motor, etc., or the pressing-down driving member 22 may include a motor and a transmission mechanism. The motor drives the powder adding rod 214 to rise and fall through the transmission mechanism.

As illustrated in FIG. 1, in the present embodiment, the pressing-down driving member 22 is the screw motor. The screw motor and the sliding sleeve base 211 are disposed on the same side of the powder adding substrate 11, and a screw of the screw motor is rotationally connected to the first joint 215, so as to drive the powder adding rod 214 to rise and fall through the up and down movement of the screw.

Figure 5:
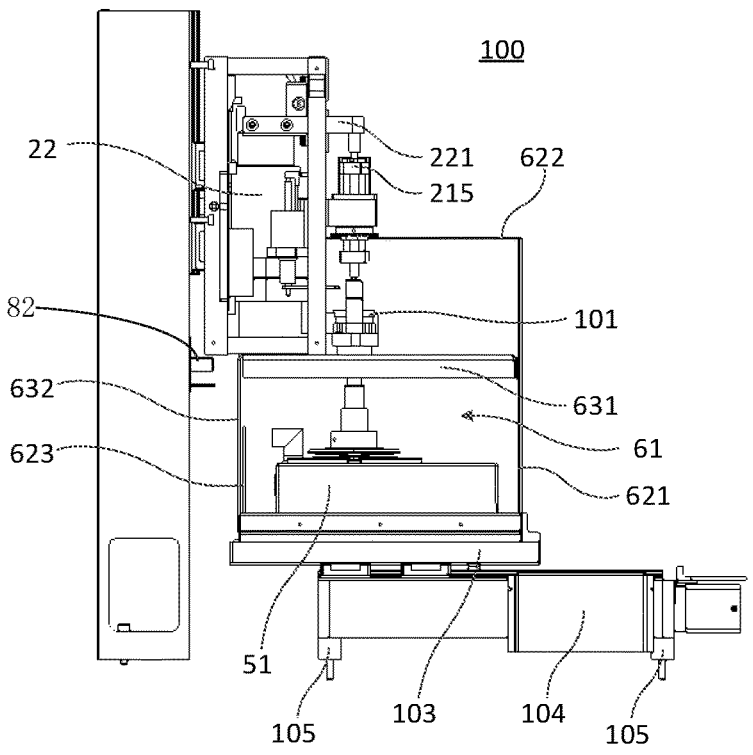
FIG. 5 is a front structural schematic view of the powder sample adding device illustrated in FIG. 4.
Figure 6:
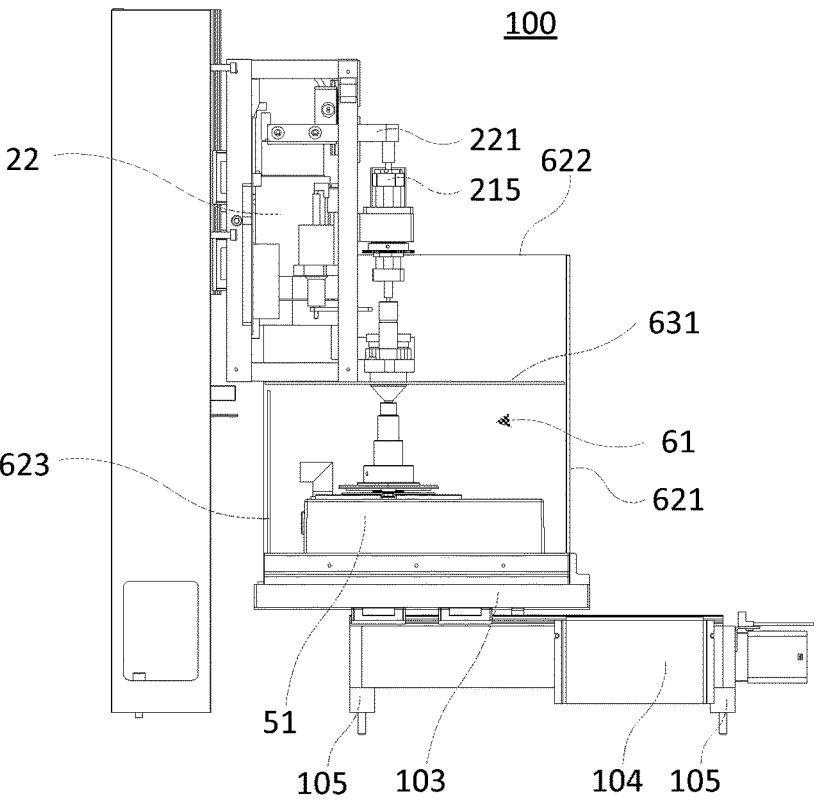
FIG. 6 is another front structural schematic view of the powder sample adding device illustrated in FIG. 4.

As illustrated in FIG. 5 or FIG. 6, in some embodiments, the pressing-down driving member 22 is a voice coil motor, which is disposed on a side of the powder adding substrate 11 away from the sliding sleeve base 211. The pressing-down driving member 22 passes through the powder adding substrate 11 through a connecting rod 221 and is rotatably connected to the first joint 215. The voice coil motor has fast response and speed, and may respond more accurately and quickly to user's control. The connecting rod 221 is roughly L-shaped and passes through the powder adding substrate 11. One end of the connecting rod 221 is connected to a driving terminal of the voice coil motor, and the other end of the connecting rod 221 is rotationally connected to the first joint 215.

As illustrated in FIG. 1, the powder sample adding device 100 further includes a pressing mechanism 40. The pressing mechanism 40 is disposed on the powder adding substrate 11, and is configured to press the powder adding bucket 101 on the powder bucket carrying member 12, to prevent the powder adding bucket 101 from shaking and affecting the powder adding efficiency.

By disposing the pressing mechanism 40, the powder adding bucket 101 is fixed on the powder bucket carrying member 12, so that the powder adding bucket 101 remains fixed relative to the powder bucket carrying member 12 during adding powder. That is, the powder adding bucket 101 is kept stable, which facilitates the smoothness and stability of adding powder.

The pressing mechanism 40 includes a pressing driving member 41 and a pressing member 42. The pressing driving member 41 is disposed on a side of the powder adding substrate 11 away from the powder adding bucket 101, to avoid the sample adding mechanism 20. The powder adding substrate 11 defines a window 110, the pressing member 42 passes through the window 110 to extend towards the powder adding bucket 101, and the pressing driving member 41 is connected to the pressing member 42 and configured for driving the pressing member 42 to press the powder adding bucket 101 or release the powder adding bucket 101.

The pressing driving member 41 may be a cylinder, or the pressing driving member 41 includes a compression motor, a screw mechanism, and a guide assembly. The compression motor drives the screw mechanism to allow the pressing member 42 to rise and fall under the guidance of the guide assembly, so as to press the powder adding bucket 101 or release the powder adding bucket 101.

In response to one end of the pressing member 42 being pressed on the powder adding bucket 101, the powder adding bucket 101 is pressed on the powder bucket carrying member 12. In response to the end of the pressing member 42 being away from the powder adding bucket 101, the powder adding bucket 101 is released. That is, the pressing and fixing of the powder adding bucket 101 is released.

The pressing mechanism 40 may further include a pressing detection assembly 43, the pressing detection assembly 43 is disposed on the powder adding substrate 11 or the pressing member 42, and is configured to detect whether the pressing member 42 presses the powder adding bucket 101.

The pressing detection assembly 43 may be a distance sensor or a pressure sensor. The distance sensor may be disposed on the powder adding substrate 11 or the pressing member 42, and configured to detect a distance between the pressing member 42 and the powder adding bucket 101, thereby confirming whether the pressing member 42 presses against the powder adding bucket 101. The pressure sensor may be disposed on the pressing member 42, to determine whether the powder adding bucket 101 is pressed by detecting the pressure.

In some embodiments, the powder bucket carrying member 12 includes a first powder bucket positioning part 120, and the first powder bucket positioning part 120 is configured to fix the powder adding bucket 101. In some embodiments, a side of the first powder bucket positioning part 120 away from the powder adding substrate 11 defines an opening to avoid the powder adding bucket 101, so that the powder adding bucket 101 may be placed on the first powder bucket positioning part 120 through the opening.

The powder sample adding device 100 may further include a powder bucket support 14. The powder bucket support 14 includes a second powder bucket positioning part 140 that cooperates with the first powder bucket positioning part 120. The powder bucket support 14 is detachably positioned and assembled on the powder bucket carrying member 12, so that the powder adding bucket 101 is simultaneously disposed on the first powder bucket positioning part 120 and the second powder bucket positioning part 140.

The powder bucket support 14 and the powder bucket carrying member 12 are detachably disposed, so that the powder adding bucket 101 may be replaced by taking away and placing the powder bucket support 14 and moving the powder adding bucket 101 with it. It is conducive to replace the powder adding bucket 101 by using an external machine (such as a manipulator), improve the efficiency of replacing the powder adding bucket 101 by the external machine, and achieve automatically taking away and placing the powder adding bucket 101 and performing an automatic powder adding operation, which is suitable for a fully automated experimental environment.

The powder bucket support 14 includes a support part 142 and a pick-up part 144. The second powder bucket positioning part 140 is located on the support part 142. The pick-up part 144 is connected to the support part 142 and extends outward from one side of the support part 142. The pick-up part 144 may be picked up by the external machine and moved with the external machine to place or replace the powder adding bucket 101.

The support part 142 is detachably positioned and assembled on the powder bucket carrying member 12. At least a part of the pick-up part 144 is located outside the powder bucket carrying member 12, so that the pick-up part 144 may be picked up by the external machine. A positioning hole may be defined in the bottom of the support part 142, and a positioning pin may be disposed at a corresponding position on the powder bucket carrying member 12. The positioning pin cooperates with the positioning hole, to achieve detachable connection between the powder bucket support 14 and the powder bucket carrying member 12.

In some embodiments, a powder bucket grab rod 146 is disposed on the pick-up part 144. The powder bucket grab rod 146 is configured to be picked up to carry the powder adding bucket 101 for loading and unloading on the powder bucket carrying member 12. The position of the powder adding bucket 101 may be positioned by the powder bucket grab rod 146, which facilitates the positioning of the powder adding bucket 101 after butt joint with the external machine and performing of the grasping depth reference, thereby improving grabbing efficiency and making it more convenient to place or replace the powder adding bucket 101.

The advantages of defining the opening on one side of the first powder bucket positioning part 120 to avoid the powder adding bucket 101 are as follows. In response to a distance between the lowermost end of the powder adding rod 214 and the powder adding bucket 101 is not large, the vertical placement or removal of the powder bucket support 14 by manual or a machine may be disturbed by the powder adding rod 214. Thus, by disposing the opening to avoid the powder adding bucket 101, the powder bucket support 14 may be placed or removed from a horizontal direction.

Figure 2:
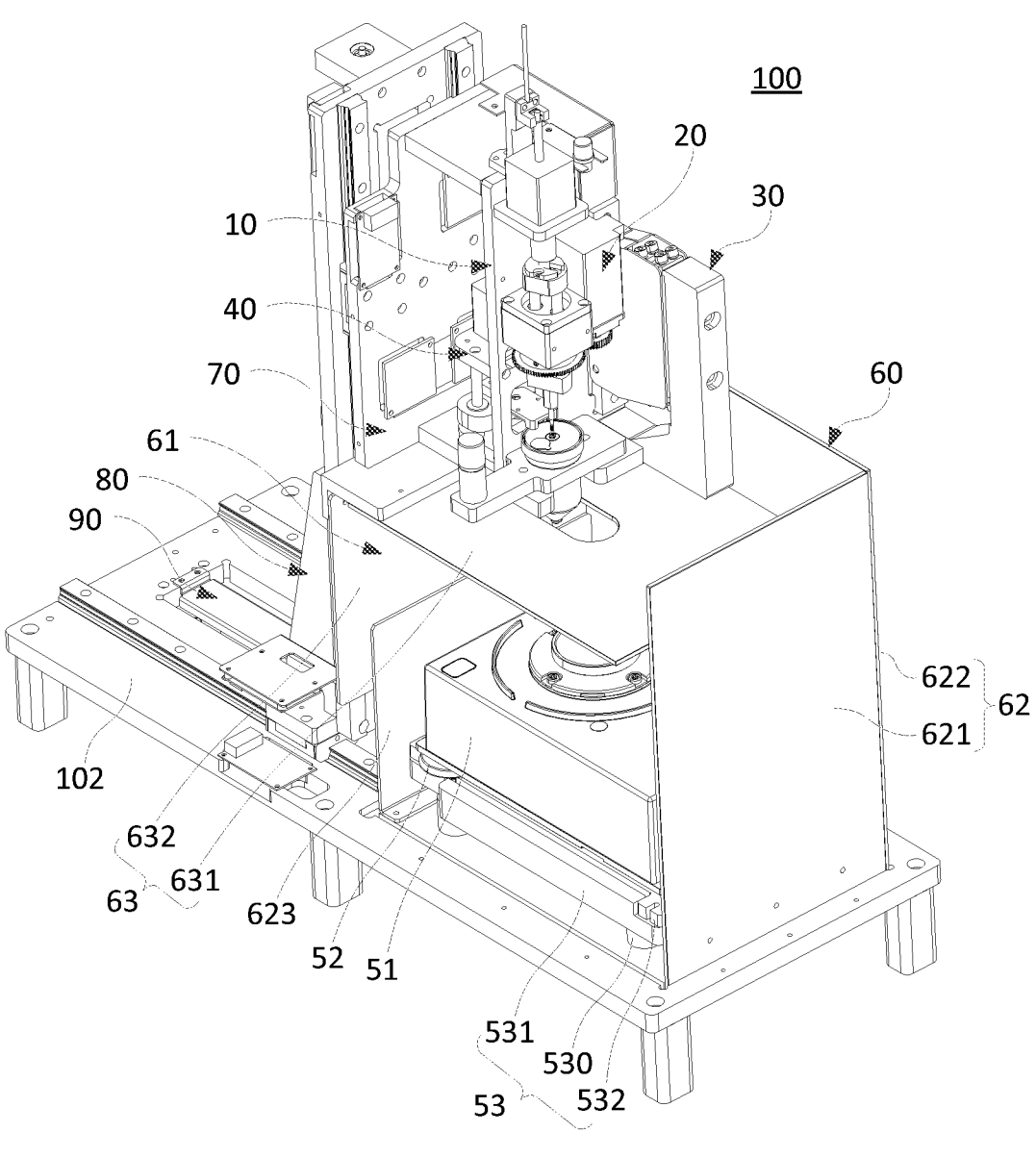
FIG. 2 is a structural schematic view of the powder sample adding device in some embodiments of the present disclosure.
Figure 3:
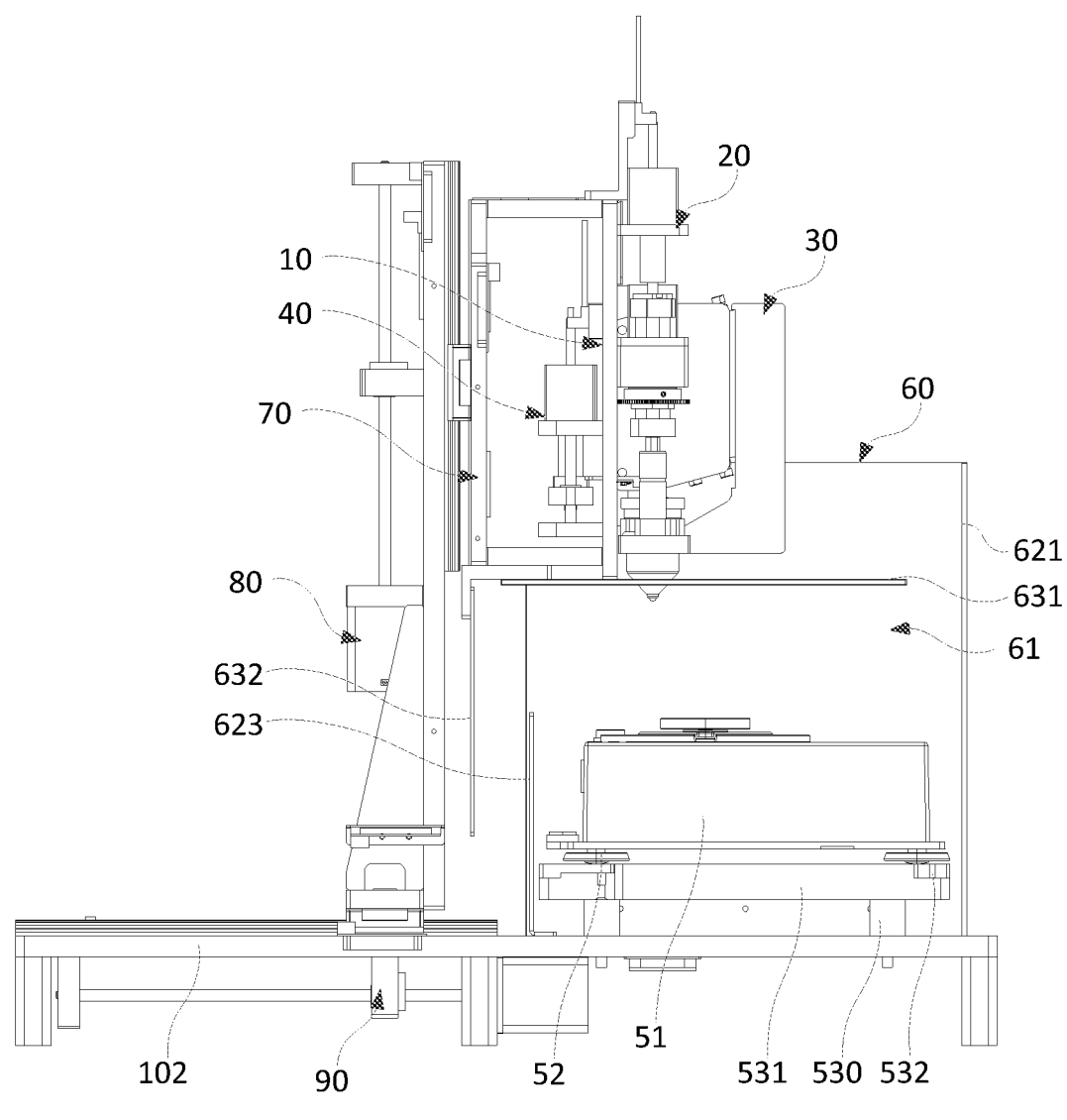
FIG. 3 is a front structural schematic view of the powder sample adding device illustrated in FIG. 2.

Referring to FIG. 2 and FIG. 3, FIG. 2 is a structural schematic view of the powder sample adding device in some embodiments of the present disclosure, and FIG. 3 is a front structural schematic view of the powder sample adding device illustrated in FIG. 2.

The powder sample adding device 100 further include a balance 51 that is disposed on a side of the powder bucket carrying member 12 away from the sample adding mechanism 20. The balance 51 may be configured to carry and weigh a container to be added with the sample.

The balance 51 has high measurement accuracy and may accurately measure the amount of powder in the container.

The efficiency of adding the powder and the accuracy of adding the powder may be improved through automatically adding powder and weighing by the balance 51.

The powder sample adding device 100 further includes a second bracket 70 and a vertical moving mechanism 80. The second bracket 70 is connected to the first bracket 10. An accommodation space is formed between the second bracket 70 and the first bracket 10 to accommodate various elements and to facilitate installation and connection to the vertical moving mechanism 80. A driving end of the vertical moving mechanism 80 is connected to the second bracket 70 to indirectly connect to the first bracket 10. The vertical moving mechanism 80 is configured to drive the sample adding mechanism 20 and the powder adding bucket 101 to rise and fall with the first bracket 10, so as to adjust a distance between the powder adding bucket 101 and the container on the balance 51 in a vertical direction, thereby facilitates butt joint of the powder adding bucket 101 and the container on the balance 51.

That is, the vertical moving mechanism 80 may drive and adjust a distance between the powder adding bucket 101 and the balance 51, so that in response to a large distance being between the powder adding bucket 101 and the balance 51, the container may be replaced or placed on the balance 51 to avoid colliding with the powder adding bucket 101 during placing the container. After the container is placed on the balance 51, the powder adding bucket 101 is driven downward and closer to the container, thereby adding the powder at a smaller distance, which may improve the powder adding efficiency and reduce inefficiency of the adding the powder due to wind or self-shaking.

The vertical moving mechanism 80 includes a vertical motor, a transmission mechanism, and a guide mechanism. The vertical motor drives the second bracket 70 through the transmission mechanism to rise and fall under the guidance of the guide mechanism. The transmission mechanism may be a belt mechanism, a rack and pinion mechanism or a screw mechanism.

The powder sample adding device 100 may further include a horizontal moving mechanism 90. The horizontal moving mechanism 90 is connected to the vertical moving mechanism 80 and configured to drive the vertical moving mechanism 80 to move in a horizontal direction perpendicular to a direction of rising and falling of the second bracket 70. A distance between the powder adding bucket 101 and the container on the balance 51 in a horizontal direction is adjusted, thereby facilitates butt joint of the powder adding bucket 101 and the container on the balance 51.

The horizontal moving mechanism 90 includes a horizontal motor, a transmission mechanism, and a guide mechanism. The horizontal motor drives the vertical moving mechanism 80 through the transmission mechanism to horizontally move under the guidance of the guide mechanism, so that the powder outlet of the powder adding bucket 101 is aligned with an opening of the container. The transmission mechanism may be a belt mechanism, a rack and pinion mechanism, or a screw mechanism.

As illustrated in FIG. 2 and FIG. 3, in the present embodiment, the powder sample adding device 100 further includes a support platform 102. The horizontal moving mechanism 90 and the balance 51 are disposed on the support platform 102, so that the powder sample adding device 100 becomes a whole, easy to install and transport. However, in the above-mentioned whole structure, the horizontal moving mechanism 90, the vertical moving mechanism 80, the sample adding mechanism 20, etc. are prone to transmit vibrations generated during their movements to the balance 51 through the support platform 102, thereby causing interference and easily affecting powder adding accuracy.

Based on this, the powder sample adding device 100 may further include a horizontal adjustment member 52, and the balance 51 is disposed on the horizontal adjustment member 52. The horizontal adjustment member 52 is configured to keep the balance 51 in a horizontal state.

The horizontal adjustment member 52 may include a plurality of height-adjustable adjustment members, which may cooperate with each other to adjust and maintain the balance 51 in the horizontal state, thereby reducing factors that affect the measurement accuracy of the balance 51 and relatively improving the measurement accuracy of the balance 51.

The powder sample adding device 100 may further include an anti-vibration assembly 53. The horizontal adjustment member 52 is disposed on the anti-vibration assembly 53. The anti-vibration assembly 53 is disposed between the horizontal adjustment member 52 and the support platform 102. The anti-vibration assembly 53 has a vibration-absorbing function for reducing vibration transmitted from the support platform 102 to the balance 51, thereby further improving the measurement accuracy of the balance 51.

In some embodiments, an elastic member, such as a spring, may be disposed between the anti-vibration assembly 53 and the horizontal adjustment member 52 to further reduce vibration.

In some embodiments, the anti-vibration assembly 53 includes a first anti-vibration member 531 and a second anti-vibration member 532. The second anti-vibration member 532 is movably connected to one side of the first anti-vibration member 531, and the second anti-vibration member 532 supports the horizontal adjustment member 52.

The anti-vibration assembly 53 may further include a plurality of anti-vibration feet 530. The plurality of anti-vibration feet 530 are fixedly connected to the other side of the first anti-vibration member 531 and connected to the support platform 102.

In some embodiments, one end of each anti-vibration foot 530 is connected to the support platform 102, and the other end of each anti-vibration foot 530 is fixedly connected to a lower side of the first anti-vibration member 531. An upper side of the first anti-vibration member 531 is movably connected to a lower side of the second anti-vibration member 532, and an upper side of the second anti-vibration member 532 is fixedly connected to the horizontal adjustment member 52. The plurality of anti-vibration feet 530 cooperate with the first anti-vibration member 531 and the second anti-vibration member 532 to perform secondary vibration absorption. The plurality of anti-vibration feet 530 are configured to absorb most of the vibration transmitted from the support platform 102. The first anti-vibration member 531 and the second anti-vibration member 532 are configured to absorb the slight vibration transmitted from the plurality of anti-vibration feet 530.

In some embodiments, the structures of the first anti-vibration member 531 and the second anti-vibration member 532 may be the same or similar. The first anti-vibration member 531 and the second anti-vibration member 532 may be planar-shaped or block-shaped. The number of each of the first anti-vibration member 531 and the second anti-vibration member 532 may be one. The first anti-vibration member 531 and the second anti-vibration member 532 may be capable of relative displacement in the horizontal direction.

In some embodiments, the first anti-vibration member 531 may be planar-shaped or block-shaped, and the number of the first anti-vibration members 531 may be only one. The number of the second anti-vibration members 532 may be multiple, such as two, three or four, etc. The plurality of second anti-vibration members 532 are movably connected to one side of the first anti-vibration member 531, and the plurality of anti-vibration feet 530 are fixedly connected to the other side of the first anti-vibration member 531. That is, the positions of the plurality of second anti-vibration members 532 may be adjusted relative to the first anti-vibration member 531 in the horizontal direction, to increase the adaptability between the powder outlet of the powder adding bucket 101 and the container.

During specific adjustment, the position of the second anti-vibration member 532 relative to the first anti-vibration member 531 is adjusted, so that the horizontal adjustment member 52 and the balance 51 located on the second anti-vibration member 532 move. Thus, the container for holding the powder on the balance 51 corresponds to the powder outlet of the powder adding bucket 101.

Figure 4:
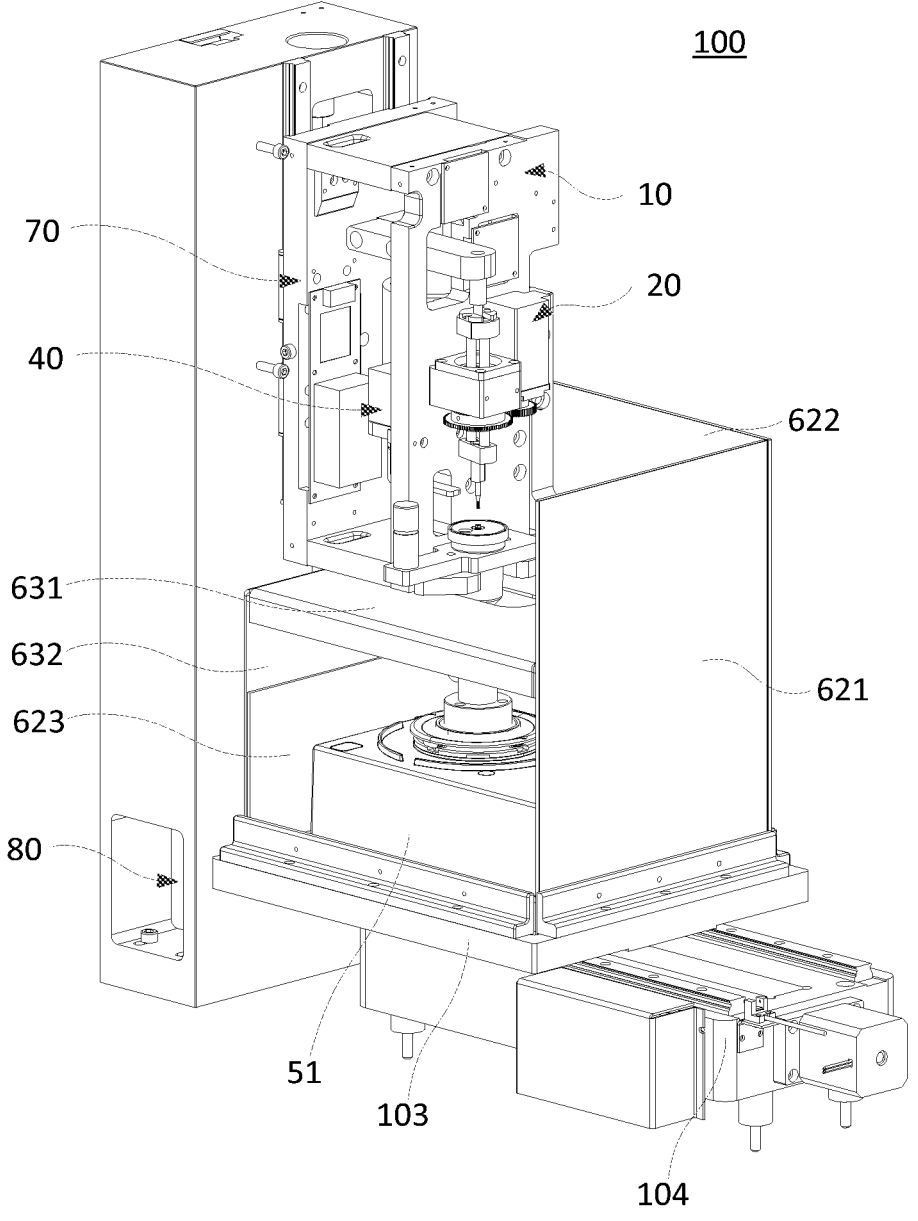
FIG. 4 is a structural schematic view of the powder sample adding device in some embodiments of the present disclosure.

As illustrated in FIG. 4 to FIG. 6, FIG. 4 is a structural schematic view of the powder sample adding device in some embodiments of the present disclosure, FIG. 5 is a front structural schematic view of the powder sample adding device illustrated in FIG. 4, and FIG. 6 is another front structural schematic view of the powder sample adding device illustrated in FIG. 4.

In some embodiments, the support platform 102 is removed to avoid interference such as vibration from the sample adding mechanism 20 being transmitted to the balance 51.

The powder sample adding device 100 further includes a carrying platform 103 and a horizontal driving mechanism 104. The horizontal driving mechanism 104 is configured to drive the carrying platform 103 to move along a first horizontal direction and/or a second horizontal direction. The first horizontal direction is perpendicular to the second horizontal direction. The vertical direction is perpendicular to the first horizontal direction and the second horizontal direction. The balance 51 is disposed on the carrying platform 103, so that the position of the container may be adjusted, and the container on the balance 51 may be aligned with the powder adding bucket 101. In response to a plurality of containers being simultaneously placed on the balance 51, different containers may be adjusted to be aligned with the powder adding bucket 101, to achieve high-throughput powder addition.

In the present embodiment, the horizontal driving mechanism 104 and the vertical moving mechanism 80 are disposed independently of each other, and the first bracket 10 and the carrying platform 103 are disposed independently of each other. In some embodiments, the first bracket 10, the sample adding mechanism 20, the micro-vibration assembly 30, the pressing mechanism 40, the second bracket 70, and the vertical moving mechanism 80 are connected as a whole. The carrying platform 103, the horizontal driving mechanism 104, and the balance 51 form a whole. These two wholes are independent of each other, that is, these two wholes are not in contact with each other, so that the disturbance such as the vibration from the side of the sample adding mechanism 20 cannot be transmitted to the side where the balance 51 is located.

The carrying platform 103 is made of a material with higher density, such as, a stainless steel or a cast iron, so as to increase its weight. That is, by increasing the weight, the anti-vibration interference ability of the balance 51 on the carrying platform 103 is improved, thereby improving the measurement accuracy of the balance 51.

In some embodiments, the powder sample adding device 100 further includes a vibration absorber 105. The vibration absorber 105 may be a rubber vibration absorber or an airbag vibration absorber, etc. The vibration absorber 105 is connected to one side of the horizontal driving mechanism 104 away from the carrying platform 103. The vibration absorber 105 is configured as a fixing member fixed on an external assembly. The vibration transmitted to the balance 51 may be greatly reduced through the vibration absorber 105, further improving the measurement accuracy of the balance 51.

In the present embodiment, the horizontal driving mechanism 104 includes a horizontal motor, a transmission mechanism, and a guide mechanism. The horizontal motor drives the carrying platform 103 through the transmission mechanism to horizontally move under the guidance of the guide mechanism, so that the powder outlet of the powder adding bucket 101 is aligned with the opening of the container. The transmission mechanism may be a screw mechanism, and the guide mechanism may be a slider guide rail mechanism.

A sensing piece is disposed on the carrying platform 103, and an optical coupler that cooperates with the sensing piece is disposed on the guide mechanism. The optical coupler serves as a position sensor to calibrate a specific position, such as, a zero position or a certain limit position, etc., to calibrate the position of the carrying platform 103.

In the present embodiment, a movement trajectory of the carrying platform 103 has a first position and a second position under the guidance of the guide mechanism. The first position is the zero position. In response to the carrying platform 103 being in the first position, the carrying platform 103 is away from the powder adding bucket 101, which may facilitate the placement or replacement of the container. In response to the carrying platform 103 being in the second position, the container on the carrying platform 103 is aligned with the powder adding bucket 101.

As illustrated in FIG. 2 to FIG. 6, the powder sample adding device 100 may further include a windproof assembly 60. The windproof assembly 60 defines a windproof cavity 61 that at least partially surrounds the balance 51 and the container. The powder outlet of the powder adding bucket 101 is in butt joint with the windproof cavity 61. That is, during adding the powder, the powder outlet of the powder adding bucket 101 is located in a surrounding range of the windproof cavity 61. By defining the windproof cavity 61, powder leakage caused by the environmental wind speed during adding the powder may be eliminated. The accuracy rate of the powder in the powder adding bucket 101 entering the container may be improved, so that the error between a weight obtained by the balance 51 and a net weight of the powder in the container is smaller.

In the present embodiment, the windproof assembly 60 includes a first windproof member 62 and a second windproof member 63. The first windproof member 62 is disposed around the balance 51, and the second windproof member 63 is configured to cooperate with the first windproof member 62 to form the windproof cavity 61. The windproof cavity 61 formed by the first windproof member 62 and the second windproof member 63 may be a three-dimensional cavity structure, a cylindrical cavity structure, or other regular or irregular-shaped cavity structures, which is not limited in the present disclosure.

The first windproof member 62 is disposed around the balance 51 to form a space, and the second windproof member 63 may be disposed on an upper part of the first windproof member 62 to cover the space, so that the first windproof member 62 and the second windproof member 63 enclose and form the windproof cavity 61. Alternatively, the first windproof member 62 may be separated from the second windproof member 63, which is easy to take away and place the container on the balance 51.

In some embodiments, the windproof assembly 60 has an anti-static property. In some embodiments, both the first windproof member 62 and the second windproof member 63 have conductive properties, that is, the first windproof member 62 and the second windproof member 63 are conductive members. Thus, the windproof assembly 60 also has an anti-static function, so that electrostatic adsorbing the powder is eliminated. For example, each of the first windproof member 62 and the second windproof member 63 is a conductive glass, or is covered by a conductive coating. Alternatively, each of the first windproof member 62 and the second windproof member 63 may be made of a conductive metal. Alternatively, the first windproof member 62 may be made of a conductive glass, and the second windproof member 63 may be made of the conductive metal, etc., which are not specifically limited in the present disclosure.

The second windproof member 63 is connected to the second bracket 70, and the vertical moving mechanism 80 drives the second bracket 70 to rise and fall, so that the second windproof member 63 covers the first windproof member 62 to form the windproof cavity 61.

As illustrated in FIG. 6, the first windproof member 62 includes a front wall 621, two side walls 622 (one of the side walls 622 is not shown in FIG. 6 to facilitate the illustration of the structure of the balance 51), and a first rear wall 623 that are disposed around the balance 51. The second windproof member 63 includes a top cover 631. The top cover 631 is configured to cover a cavity formed by the front wall 621, the two side walls 622, and the first rear wall 623. The top cover 631 defines an opening that is in butt joint with the powder adding bucket 101. In this case, the top cover 631 may rise and fall with the vertical moving mechanism 80. The front wall 621, the two side walls 622, and the first rear wall 623 may horizontally move with the horizontal driving mechanism 104.

In some embodiments, a limit member 82 is disposed on the vertical moving mechanism 80. The limit member 82 is configured to limit a descending stroke of the vertical moving mechanism 80, so that the top cover 631 avoids hitting against the first rear wall 623. Thus, a gap between the top cover 631 and the first rear wall 623 may be as small as possible, to reduce the impact of an external airflow on the windproof cavity 61.

As illustrated in FIG. 2 to FIG. 5, the second windproof member 63 includes the top cover 631 and a second rear wall 632 connected to the top cover 631. A height of the first rear wall 623 is smaller than that of the front wall 621 and smaller than that of each of the two side walls 622. The second rear wall 632 is configured to block a gap between the top cover 631 and the first rear wall 623. A sum of the heights of the first rear wall 623 and the second rear wall 632 is greater than or equal to the height of the front wall 621 and greater than or equal to the height of each of the two side walls 622. By raising and falling the second windproof member 63, the height of the windproof cavity 61 is adjusted, that is, a volume of the windproof cavity 61 is adjusted. The volume of the windproof cavity 61 is adjusted to adapt to a size of the container, so that the volume of the windproof cavity 61 is as small as possible, so as to reduce a flow rate of an air flow in the windproof cavity 61, thereby improving the measurement accuracy of the balance 51. In FIG. 2 and FIG. 3, the top cover 631 and the second rear wall 632 may rise and fall with the vertical moving mechanism 80; and the front wall 621, the two side walls 622, and the first rear wall 623 may horizontally move with the horizontal moving mechanism 90. Alternatively, the top cover 631 and the second rear wall 632 may not only rise and fall with the vertical moving mechanism 80, but also horizontally move with the horizontal moving mechanism 90; and the front wall 621, the two side walls 622, and the first rear wall 623 may be fixed. In FIG. 4 and FIG. 5, the top cover 631 and the second rear wall 632 may rise and fall with the vertical moving mechanism 80; and the front wall 621, the two side walls 622, and the first rear wall 623 may horizontally move with the horizontal driving mechanism 104.

In some embodiments, the windproof assembly 60 may only include the first windproof member 62, and does not include the second windproof member 63, that is, the windproof assembly 60 does not include the top cover. In some embodiments, the carrying platform 103, the balance 51, and the first windproof member 62 are fixed, that is, there is no need to dispose the horizontal driving mechanism 104, but only disposing the vertical moving mechanism 80 that drives the powder adding bucket 101 to rise and fall.

Figure 10:
FIG. 10 is a structural schematic view of yet another embodiment of the windproof assembly of the powder sample adding device illustrated in FIG. 1 or FIG. 4.
Figure 10:
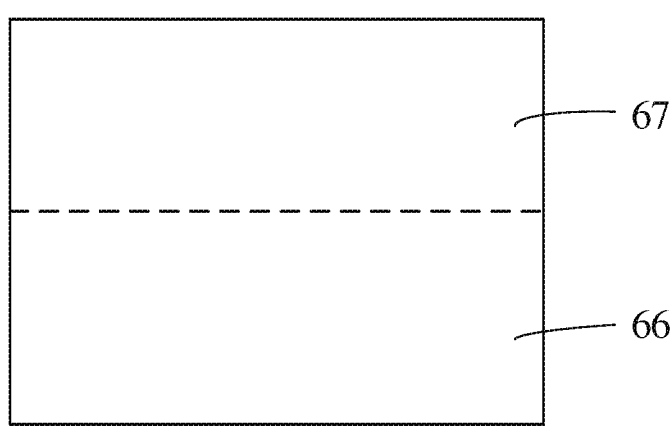

In some embodiments, as illustrated in FIG. 10, the windproof assembly 60 includes a first box body 66 and a second box body 67. The second box body 67 is hinged with the first box body 66. The first box body 66 and a second box body 67 cooperate with each other to form the windproof cavity 61 that cover the balance 51. The first box body 66 or the second box body 67 defines an opening that is in butt joint with the powder adding bucket 101.

In some embodiments, the first box body 66 may be fixed on the carrying platform 103. The second box body 67 rotates relative to the first box body 66 to open the windproof cavity 61, so that the user or the machine may take away and place the container. After the container is placed, the second box body 67 inversely rotates relative to the first box body 66 to form the windproof cavity 61, so that the container may be located in the windproof cavity 61.

Figure 7:
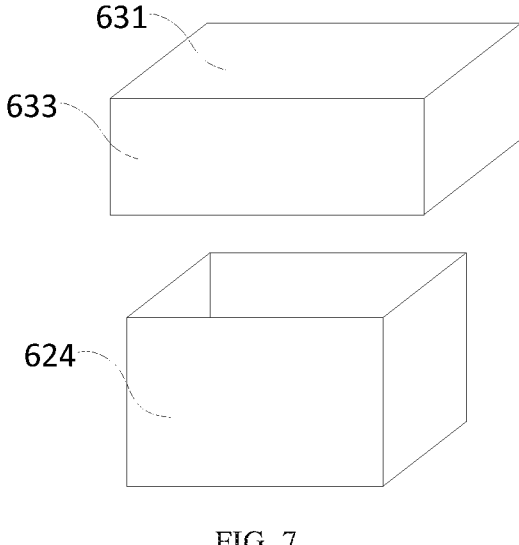
FIG. 7 is a structural schematic view of an embodiment of a windproof assembly of the powder sample adding device illustrated in FIG. 1 or FIG. 4.

In some embodiments, as illustrated in FIG. 7, the first windproof member 62 includes a first surrounding wall 624 disposed around the balance 51. The second windproof member 63 includes the top cover 631 and a second surrounding wall 633 connected to the top cover 631. The top cover 631 defines an opening that is in butt joint with the powder adding bucket 101. In response to the vertical moving mechanism 80 driving the second windproof member 63 to cover the first windproof member 62, the first surrounding wall 624 and the second surrounding wall 633 are sleeved on each other. Each of the first surrounding wall 624 and the second surrounding wall 633 may be a rectangular structure as illustrated in FIG. 7, or may be a cylindrical structure or other multi-faceted three-dimensional structures.

Figure 8:
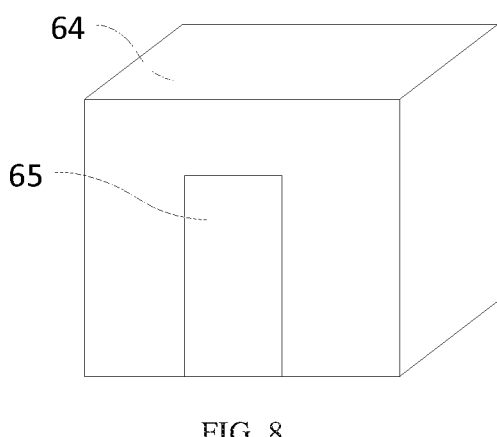
FIG. 8 is a structural schematic view of another embodiment of the windproof assembly of the powder sample adding device illustrated in FIG. 1 or FIG. 4.

In some embodiments, as illustrated in FIG. 8, the windproof assembly 60 includes a windproof cover 64 and a door body 65 disposed on the windproof cover 64. The windproof cover 64 at least surrounds the balance 51 and the sample adding mechanism 20. The powder adding bucket 101 is located in the windproof cover 64. For example, the windproof cover 64 covers the outside all elements that include the balance 51 and the sample adding mechanism 20, so that the sample adding mechanism 20 operates in the windproof cavity 61. The door body 65 may be opened and closed for taking away and placing the powder adding bucket 101 and the container.

Figure 9:
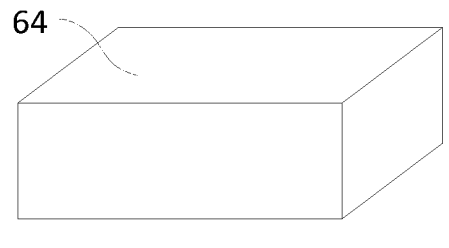
FIG. 9 is a structural schematic view of yet another embodiment of the windproof assembly of the powder sample adding device illustrated in FIG. 1 or FIG. 4.

In some embodiments, as illustrated in FIG. 9, the windproof assembly 60 includes the windproof cover 64 connected to the first bracket 10. The windproof cover 64 defines an opening that is in butt joint with the powder adding bucket 101. In response to the need to add the powder, the vertical moving mechanism 80 drives the first bracket 10 to fall, the windproof cover 64 may cover the balance 51 and the container. There is no structure, such as the first surrounding wall 624, around a peripheral side of the balance 51, that is, only the windproof cover 64 form the windproof cavity 61 to cover the balance 51 and the container.

Figure 11:
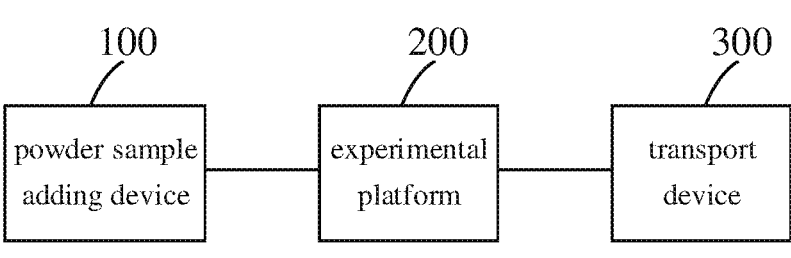
FIG. 11 is a structural schematic view of a powder sample adding system in some embodiments of the present disclosure.

Based on this, as illustrated in FIG. 11, the present disclosure further provides a powder sample adding system 400. The powder sample adding system 400 includes an experimental platform 200 and any of the above-mentioned powder sample adding devices 100. The powder sample adding device 100 is disposed on the experimental platform 200, and is configured to controllably add the powder to the container to meet the experimental requirements.

This experimental platform 200 may be configured for biological testing, chemical testing or material testing, etc.

The powder sample adding system 400 may further include a transport device 300. The transport device 300 is disposed on the experimental platform 200. The transport device 300 is configured to take away and place the powder adding bucket 101 on the powder bucket carrying member 12 of the powder sample adding device 100, and/or take away and place the container on the balance 51 of powder sample adding device 100, to achieve fully automated operation of the powder sample adding system 400. The transport device 300 may be a robotic arm, such as a four-axis robotic arm, a six-axis robotic arm, etc., or an XYZ three-axis moving mechanism, etc., which is not limited in the present disclosure.

The present disclosure provides a powder sample adding device and a powder sample adding system. The first bracket, the sample adding mechanism, and the balance are disposed. The powder bucket carrying member of the first bracket is configured to carry the powder adding bucket. The sample adding mechanism is connected to the powder adding substrate of the first bracket, and acts on the powder adding member by the stirring driving member and the pressing driving member. Thus, the powder adding member is in butt joint with the powder adding bucket, to drive the powder adding bucket to perform the powder adding operation, thereby replacing manual powder adding and achieving the automation of the powder adding action. The balance is disposed below the powder bucket carrying member. The balance is configured to carry and weigh the container to be added with the powder. During adding the powder, the balance may accurately weigh the weight of the container with the powder, so that the amount of powder may be quickly determined. Compared with manually adding powder, the powder sample adding device provided by the present disclosure may achieve automatically adding the powder, the powder adding efficiency is high and the error is low, thereby achieving high-throughput and rapid powder addition.

The above descriptions are only some embodiments of the present disclosure, and are not intended to limit the scope of the present disclosure. Any equivalent structure or equivalent flow transformation made by using the contents of the specification and accompanying drawings of the present disclosure, or directly or indirectly applied to other related technical fields, is included in the scope of the patent protection of the present disclosure.

What is claimed is:

1. A powder sample adding device, comprising:

a first bracket, comprising a powder adding substrate and a powder bucket carrying member, wherein the powder adding substrate is connected to the powder bucket carrying member, and the powder bucket carrying member is configured for carrying a powder adding bucket; and a sample adding mechanism, connected to the powder adding substrate, wherein the sample adding mechanism comprises a powder adding member, a stirring driving member, and a pressing-down driving member; the stirring driving member is connected to the powder adding member in a transmission way and configured to drive the powder adding member to rotate; the pressing-down driving member is rotatably connected to the powder adding member and configured to drive the powder adding member to rise and fall relative to the powder adding substrate; and the stirring driving member and the pressing-down driving member jointly act on the powder adding member, so that the powder adding member is in butt joint with the powder adding bucket, to drive the powder adding bucket to perform a powder adding operation.

2. The powder sample adding device according to claim 1, wherein the powder adding member comprises a sliding sleeve base, a rotating sliding sleeve, and a powder adding rod; the sliding sleeve base is connected to the powder adding substrate, and the rotating sliding sleeve is rotatably disposed inside the sliding sleeve base; the powder adding rod movably passes through the rotating sliding sleeve, and one end of the powder adding rod away from the powder adding bucket is rotatably connected to the pressing-down driving member, and the pressing-down driving member is configured to drive the powder adding rod to rise and fall relative to the rotating sliding sleeve; and the stirring driving member is connected to the rotating sliding sleeve in the transmission way, and configured for driving the rotating sliding sleeve to rotate, so as to drive the powder adding rod to rotate.

3. The powder sample adding device according to claim 2, wherein the powder adding rod comprises a first joint, a guide rod, a second joint, and an output rod; the first joint is rotatably connected to an output end of the pressing-down driving member; the guide rod movably passes through the rotating slide sleeve, and two opposite ends of the guide rod are respectively connected to the first joint and the second joint; and the output rod is connected to one side of the second joint away from the guide rod, and the output rod is configured to be in butt joint with the powder adding bucket; and the number of guide rods is at least two, and at least two guide rods are disposed in parallel.

4. The powder sample adding device according to claim 2, wherein the stirring driving member comprises:

a driving motor; and a transmission assembly, disposed between an output end of the driving motor and the rotating sliding sleeve, wherein the transmission assembly comprises a first gear and a second gear, the first gear is connected to the output end of the driving motor, the second gear is connected to the rotating slide sleeve, and the first gear and the second gear are meshed with each other.

5. The powder sample adding device according to claim 1, further comprising a pressing mechanism, wherein the pressing mechanism is disposed on the powder adding substrate and configured for pressing the powder adding bucket onto the powder bucket carrying member; and the pressing mechanism comprises a pressing driving member and a pressing member, and the pressing driving member is disposed on one side of the powder adding substrate away from the powder adding bucket; a window is defined on the powder adding substrate, and the pressing member passes through the window to extend towards the powder adding bucket; and the pressing driving member is connected to the pressing member and configured for driving the pressing member to press the powder adding bucket or release the powder adding bucket.

6. The powder sample adding device according to claim 1, further comprising a micro-vibration assembly connected to the powder bucket carrying member and configured to drive the powder bucket carrying member to vibrate.

7. The powder sample adding device according to claim 6, wherein the micro-vibration assembly is further connected to the powder adding substrate; and the micro-vibration assembly comprises a micro-vibration member and a vibration frame, the micro-vibration member is connected to the powder adding substrate, and the vibration frame is connected to the micro-vibration member and the powder bucket carrying member.

8. The powder sample adding device according to claim 1, wherein the powder bucket carrying member comprises a first powder bucket positioning part configured to fix the powder adding bucket;

one side of the first powder bucket positioning part away from the powder adding substrate defines an opening to avoid the powder adding bucket; and the powder sample adding device further comprises a powder bucket support, the powder bucket support comprises a second powder bucket positioning part that is cooperates with the first powder bucket positioning part; the powder bucket support is detachably positioned and assembled on the powder bucket carrying member, so that the powder adding bucket is simultaneously disposed on the first powder bucket positioning part and the second powder bucket positioning part.

9. The powder sample adding device according to claim 8, wherein the powder bucket support comprises a support part and a pick-up part, the second powder bucket positioning part is located on the support part, and the pick-up part is connected to the support part and extends outward from one side of the support part; the powder bucket support further comprises a powder bucket grab rod disposed on the pick-up part, and the powder bucket grab rod is configured for being picked up to carry the powder adding bucket for loading and unloading on the powder bucket support.

10. The powder sample adding device according to claim 1, further comprising a balance disposed on one side of the powder bucket carrying member away from the sample adding mechanism, and the balance is configured for carrying and weighing a container to be added with the powder.

11. The powder sample adding device according to claim 10, further comprising a vertical moving mechanism, and a driving end of the vertical moving mechanism is connected to the first bracket, and configured to drive the sample adding mechanism and the powder adding bucket to rise and fall with the first bracket, so as to adjust a distance between the container on the balance and the powder adding bucket in a vertical direction.

12. The powder sample adding device according to claim 11, further comprising a carrying platform and a horizontal driving mechanism, wherein the horizontal driving mechanism is configured to drive the carrying platform to move along a first horizontal direction and/or a second horizontal direction, and the first horizontal direction is perpendicular to the second horizontal direction; the balance is disposed on the carrying platform; and the horizontal driving mechanism and the vertical moving mechanism are disposed independently of each other, and the first bracket and the carrying platform are disposed independently of each other.

13. The powder sample adding device according to claim 11, further comprising a horizontal moving mechanism, wherein the horizontal moving mechanism is connected to the vertical moving mechanism and configured for driving the vertical moving mechanism to move along a horizontal direction perpendicular to a direction of rising and falling, so as to adjust the distance between the container on the balance and the powder adding bucket in a horizontal direction.

14. The powder sample adding device according to claim 11, further comprising a windproof assembly, wherein the windproof assembly defines a windproof cavity that at least partially surrounds the balance and container, and a powder outlet of the powder adding bucket is aligned with and communicated with the windproof cavity.

15. The powder sample adding device according to claim 14, wherein the windproof assembly comprises a first windproof member and a second windproof member, wherein the first windproof member is disposed around the balance; and the powder sample adding device further comprises a second bracket connected to the first bracket, the second windproof member is connected to the second bracket, and the vertical moving mechanism is connected to the second bracket and configured for driving the second bracket to rise and fall, so that the second windproof member covers the first windproof member to form the windproof cavity.

16. The powder sample adding device according to claim 15, wherein the first windproof member comprises a front wall, two side walls, and a first rear wall that are disposed around the balance; the second windproof member comprises a top cover configured for covering a cavity formed by the front wall, the two side walls, and the first rear wall; and the top cover defines an opening configured for butt joint with the powder adding bucket.

17. The powder sample adding device according to claim 16, wherein a limit member is disposed on the vertical moving mechanism, and the limit member is configured to limit a descending stroke of the vertical moving mechanism to prevent the top cover from hitting against the first rear wall; and/or the second windproof member further comprises a second rear wall connected to the top cover, a height of the first rear wall is smaller than that of the front wall and smaller than that of each of the two side walls, and the second rear wall is configured to cover a gap between the top cover and the first rear wall; and a sum of the height of the first rear wall and a height of the second rear wall is greater than or equal to the height of the front wall and greater than or equal to the height of each of the two side walls.

18. The powder sample adding device according to claim 14, wherein the windproof assembly comprises a first box body and a second box body, the second box body is hinged with the first box body and cover the balance, and an opening that is in butt joint with the powder adding bucket is defined on the first box body or the second box body; or the windproof assembly comprises a first windproof member and a second windproof member, the first windproof member comprises a first surrounding wall disposed around the balance, the second windproof member comprises a top cover and a second surrounding wall connected to the top cover, and the top cover defines an opening configured for butt joint with the powder adding bucket; in response to the second windproof member covering the first windproof member, the first surrounding wall and the second surrounding wall are sleeved with each other; or the windproof assembly comprises a windproof cover and a door body disposed on the windproof cover, and the windproof cover at least surrounds the balance and the sample adding mechanism; or the windproof assembly comprises a windproof cover connected to the first bracket, the windproof cover defines an opening that is in butt joint with the powder adding bucket; and in response to the vertical moving mechanism driving the first bracket to fall, the windproof cover covers the balance and the container.

19. The powder sample adding device according to claim 10, further comprising:

a horizontal adjustment member, wherein the balance is disposed on the horizontal adjustment member, and the horizontal adjustment member is configured to keep the balance in a horizontal state; and an anti-vibration assembly, wherein the horizontal adjustment member is disposed on the anti-vibration assembly; the anti-vibration assembly comprises a first anti-vibration member and a second anti-vibration member, wherein the second anti-vibration member is movably connected to one side of the first anti-vibration member, and the second anti-vibration member supports the horizontal adjustment member; and the anti-vibration assembly further comprises a plurality of anti-vibration feet fixedly connected to the other side of the first anti-vibration member.

20. A powder sample adding system, comprising:

an experimental platform;

a powder sample adding device, disposed on the experimental platform, wherein the powder sample adding device comprises:

a first bracket, comprising a powder adding substrate and a powder bucket carrying member, wherein the powder adding substrate is connected to the powder bucket carrying member, and the powder bucket carrying member is configured for carrying a powder adding bucket; and a sample adding mechanism, connected to the powder adding substrate, wherein the sample adding mechanism comprises a powder adding member, a stirring driving member, and a pressing-down driving member; the stirring driving member is connected to the powder adding member in a transmission way and configured to drive the powder adding member to rotate; the pressing-down driving member is rotatably connected to the powder adding member and configured to drive the powder adding member to rise and fall relative to the powder adding substrate; and the stirring driving member and the pressing-down driving member jointly act on the powder adding member, so that the powder adding member is in butt joint with the powder adding bucket, to drive the powder adding bucket to perform a powder adding operation; and

a transport device, disposed on the experimental platform, wherein the transport device is configured to take away and place the powder adding bucket on the powder bucket carrying member of the powder sample adding device.

* * * * *